US012700242B2

(12) United States Patent
Ferguson et al.

(10) Patent No.: US 12,700,242 B2
(45) Date of Patent: Aug. 4, 2026

(54) USE OF DETECTED OBJECTS FOR IMAGE PROCESSING

(71) Applicant: Waymo LLC, Mountain View, CA (US)

(72) Inventors: Dave Ferguson, Mountain View, CA (US); Abhijit Ogale, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 59 days.

(21) Appl. No.: 18/668,912

(22) Filed: May 20, 2024

(65) Prior Publication Data

US 2024/0302838 A1 Sep. 12, 2024

Related U.S. Application Data

(63) Continuation of application No. 17/452,483, filed on Oct. 27, 2021, now Pat. No. 12,019,443, which is a
(Continued)

(51) Int. Cl.
*G06V 20/58* (2022.01)
*B60W 40/06* (2012.01)
(Continued)

(52) U.S. Cl.
CPC ............. *G06V 20/58* (2022.01); *B60W 40/06* (2013.01); *G01S 13/02* (2013.01); *G01S 17/02* (2013.01);
(Continued)

(58) Field of Classification Search
CPC .. G05D 1/0088; G05D 1/0231; G05D 1/0246; G05D 1/247; G05D 1/249;
(Continued)

(56) References Cited

U.S. PATENT DOCUMENTS 6,058,339 A 5/2000 Takiguchi
7,136,750 B2 11/2006 Takahama
(Continued)

FOREIGN PATENT DOCUMENTS

DE 102011084596 A1 * 4/2013 ......... G01C 21/3644
DE 102008006951 B4 5/2019
(Continued)

OTHER PUBLICATIONS

Machine Translation DE-102011084596-A (Year: 2013).*

*Primary Examiner* — Frederick M Brushaber
(74) *Attorney, Agent, or Firm* — McDonnell Boehnen Hulbert & Berghoff LLP

(57) ABSTRACT

Methods and systems for the use of detected objects for image processing are described. A computing device autonomously controlling a vehicle may receive images of the environment surrounding the vehicle from an image-capture device coupled to the vehicle. In order to process the images, the computing device may receive information indicating characteristics of objects in the images from one or more sources coupled to the vehicle. Examples of sources may include RADAR, LIDAR, a map, sensors, a global positioning system (GPS), or other cameras. The computing device may use the information indicating characteristics of the objects to process received images, including determining the approximate locations of objects within the images. Further, while processing the image, the computing device may use information from sources to determine portions of the image to focus upon that may allow the computing device to determine a control strategy based on portions of the image.

20 Claims, 7 Drawing Sheets

Related U.S. Application Data continuation of application No. 16/714,065, filed on Dec. 13, 2019, now Pat. No. 11,181,914, which is a continuation of application No. 15/713,263, filed on Sep. 22, 2017, now Pat. No. 10,509,402, which is a continuation of application No. 14/855,009, filed on Sep. 15, 2015, now Pat. No. 9,804,597, which is a continuation of application No. 13/864,336, filed on Apr. 17, 2013, now Pat. No. 9,164,511.

(51) Int. Cl.

| | | |
|---|---|---|
| *G01S 13/02* | (2006.01) | |
| *G01S 17/02* | (2020.01) | |
| *G05D 1/00* | (2024.01) | |

(52) U.S. Cl.
CPC ......... *G05D 1/0231* (2013.01); *G05D 1/0246* (2013.01); *G06V 20/584* (2022.01); *B60W 2420/403* (2013.01)

(58) Field of Classification Search
CPC ........ G05D 1/81; B60W 30/00; B60W 30/10; B60W 40/04; B60W 40/06; G01S 13/02; G01S 17/02; G01S 19/13; G06V 20/58; G06V 20/584; H04N 5/77
See application file for complete search history.

(56) References Cited

U.S. PATENT DOCUMENTS

| | | | |
|---|---|---|---|
| 7,974,784 | B2 | 7/2011 | Moriizumi |
| 8,086,071 | B2 | 12/2011 | Chen |
| 8,169,186 | B1 | 5/2012 | Haddad |
| 8,294,608 | B1 | 10/2012 | Lynam |
| 8,639,433 | B2 | 1/2014 | Meis |
| 8,665,079 | B2 | 3/2014 | Pawlicki |
| 8,761,991 | B1 | 6/2014 | Ferguson |
| 9,381,916 | B1 | 7/2016 | Zhu |
| 9,495,874 | B1 | 11/2016 | Zhu |
| 10,223,600 | B2 | 3/2019 | Fischer |
| 10,293,826 | B2 | 5/2019 | Clarke |
| 2004/0016870 | A1 | 1/2004 | Pawlicki |
| 2004/0062442 | A1 | 4/2004 | Laumeyer |
| 2004/0101166 | A1 | 5/2004 | Williams |
| 2004/0178945 | A1 | 9/2004 | Buchanan |
| 2007/0005609 | A1 | 1/2007 | Breed |
| 2007/0021915 | A1 | 1/2007 | Breed |

| | | | | |
|---|---|---|---|---|
| 2008/0027591 | A1 | 1/2008 | Lenser | |
| 2008/0165028 | A1* | 7/2008 | Fechner | ................. G08G 1/163 |
| | | | | 340/901 |
| 2008/0181461 | A1* | 7/2008 | Saito | .................... G06V 20/584 |
| | | | | 382/104 |
| 2009/0079553 | A1 | 3/2009 | Yanagi | |
| 2009/0085775 | A1 | 4/2009 | Otsuka | |
| 2009/0265069 | A1 | 10/2009 | Desbrunes | |
| 2009/0303077 | A1 | 12/2009 | Onome | |
| 2010/0067805 | A1 | 3/2010 | Klefenz | |
| 2010/0100268 | A1 | 4/2010 | Zhang | |
| 2010/0253598 | A1 | 10/2010 | Szczerba | |
| 2010/0322516 | A1 | 12/2010 | Xu | |
| 2011/0095907 | A1 | 4/2011 | Kushi | |
| 2011/0282581 | A1 | 11/2011 | Zeng | |
| 2012/0008866 | A1* | 1/2012 | Halimeh | .............. G06T 7/0002 |
| | | | | 382/190 |
| 2012/0022716 | A1 | 1/2012 | Kitahama | |
| 2012/0083982 | A1 | 4/2012 | Bonefas | |
| 2012/0207348 | A1* | 8/2012 | Saito | ...................... G06V 10/25 |
| | | | | 382/103 |
| 2012/0212612 | A1 | 8/2012 | Imai | |
| 2012/0288138 | A1 | 11/2012 | Zeng | |
| 2012/0299478 | A1 | 11/2012 | Park | |
| 2012/0303222 | A1 | 11/2012 | Cooprider | |
| 2012/0308082 | A1* | 12/2012 | Murao | ................. G06V 20/584 |
| | | | | 382/103 |
| 2013/0027557 | A1* | 1/2013 | Hirai | ...................... G06V 20/56 |
| | | | | 348/148 |
| 2013/0113633 | A1 | 5/2013 | Pilutti | |
| 2013/0211659 | A1 | 8/2013 | Peynot | |
| 2013/0222127 | A1* | 8/2013 | Ray Avalani | .......... G06V 20/58 |
| | | | | 340/436 |
| 2013/0253754 | A1 | 9/2013 | Ferguson | |
| 2014/0226349 | A1* | 8/2014 | Morishita | ............ G06V 20/584 |
| | | | | 348/148 |
| 2014/0320316 | A1 | 10/2014 | Peri | |
| 2014/0347475 | A1 | 11/2014 | Divakaran | |
| 2015/0203033 | A1 | 7/2015 | Watanabe | |
| 2015/0310281 | A1 | 10/2015 | Zhu | |
| 2016/0054138 | A1 | 2/2016 | Kojo | |

FOREIGN PATENT DOCUMENTS

| | | |
|---|---|---|
| EP | 1939649 A2 | 2/2009 |
| EP | 2443586 B1 | 2/2020 |
| WO | 2011109856 A1 | 9/2011 |
| WO | 2013083313 A1 | 6/2013 |

* cited by examiner

Right Side View

Front View

Back View

Top View

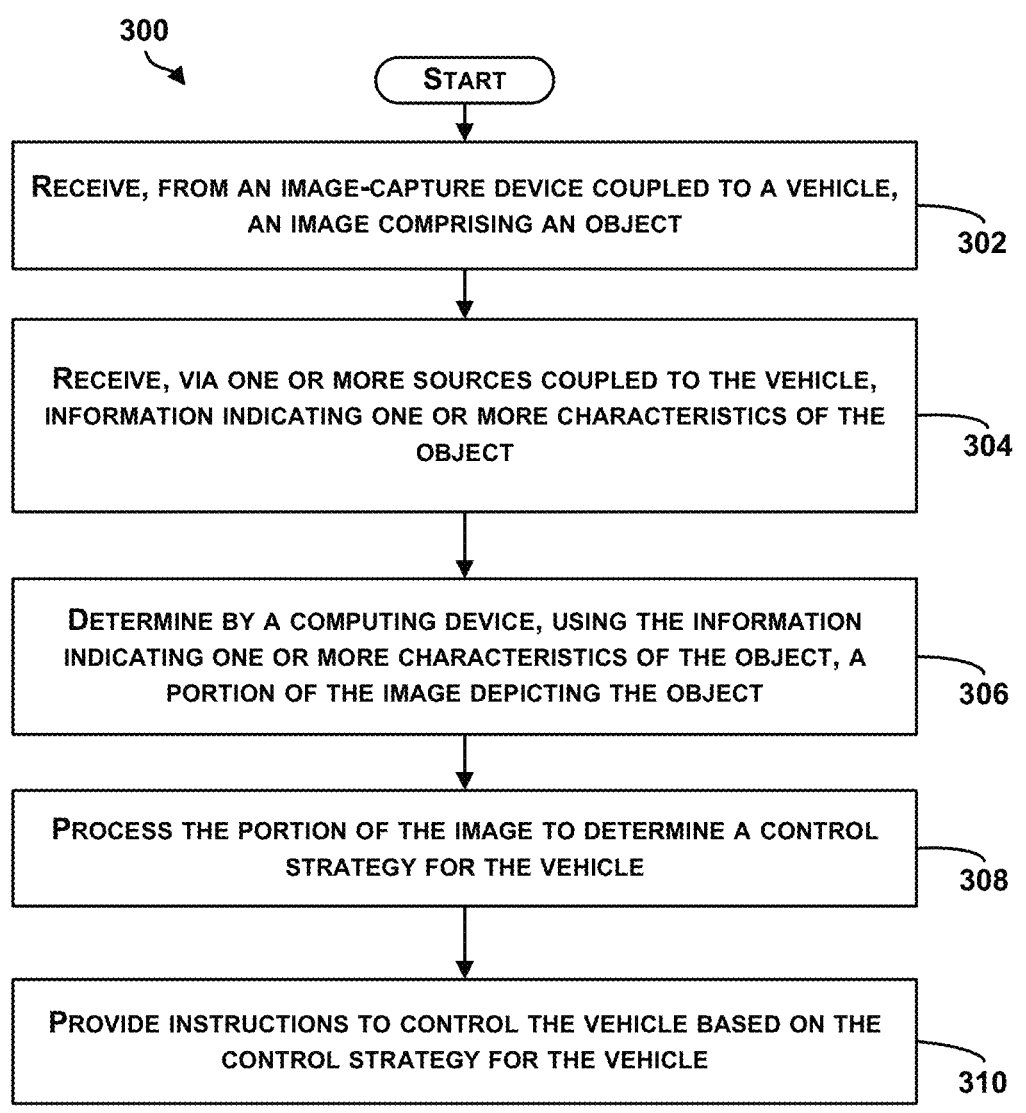

300

START

RECEIVE, FROM AN IMAGE-CAPTURE DEVICE COUPLED TO A VEHICLE, AN IMAGE COMPRISING AN OBJECT    302

RECEIVE, VIA ONE OR MORE SOURCES COUPLED TO THE VEHICLE, INFORMATION INDICATING ONE OR MORE CHARACTERISTICS OF THE OBJECT    304

DETERMINE BY A COMPUTING DEVICE, USING THE INFORMATION INDICATING ONE OR MORE CHARACTERISTICS OF THE OBJECT, A PORTION OF THE IMAGE DEPICTING THE OBJECT    306

PROCESS THE PORTION OF THE IMAGE TO DETERMINE A CONTROL STRATEGY FOR THE VEHICLE    308

PROVIDE INSTRUCTIONS TO CONTROL THE VEHICLE BASED ON THE CONTROL STRATEGY FOR THE VEHICLE    310

FIGURE 3

USE OF DETECTED OBJECTS FOR IMAGE PROCESSING

CROSS-REFERENCE TO RELATED APPLICATIONS

The present patent application is a continuation of U.S. patent application Ser. No. 17/452,483, filed on Oct. 27, 2021, which is a continuation of U.S. patent application Ser. No. 16/714,065, filed on Dec. 13, 2019 (now U.S. Pat. No. 11,181,914), which is a continuation of U.S. patent application Ser. No. 15/713,263, filed on Sep. 22, 2017 (now U.S. Pat. No. 10,509,402), which is a continuation of U.S. patent application Ser. No. 14/855,009, filed on Sep. 15, 2015 (now U.S. Pat. No. 9,804,597), which is a continuation of U.S. patent application Ser. No. 13/864,336, filed on Apr. 17, 2013 (now U.S. Pat. No. 9,164,511), all of which are hereby incorporated by reference in their entirety including all tables, figures, and claims.

BACKGROUND

Autonomous vehicles use various computing systems to aid in transporting passengers from one location to another. In some cases, autonomous vehicles may operate without receiving any input from a driver or passenger, but through analyzing objects. Some autonomous vehicles may use a system of image-capture devices to capture images of the environment including objects around the autonomous vehicle. An autonomous vehicle may use the images to assist in making determinations during operation. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

SUMMARY

The present application discloses examples that relate to the use of detected objects for image processing. In one aspect, the present application describes a method. The method may comprise receiving, from an image-capture device coupled to a vehicle, an image comprising an object. The method also may comprise receiving, via one or more source coupled to the vehicle, information indicating one or more characteristics of the object. The method may further comprise determining by a computer device, using the information indicating one or more characteristics of the object, a portion of the image depicting the object. In addition, the method may include processing the portion of the image to determine a control strategy for the vehicle. The method may also comprise providing instructions to control the vehicle based on the control strategy for the vehicle.

In another aspect, the present application describes a non-transitory computer readable medium having stored thereon executable instructions that, upon execution by a computing device, cause the computing device to perform functions. The functions may comprise receiving, from an image-capture device coupled to a vehicle, an image comprising an object. In addition, the functions may comprise receiving, via one or more sources coupled to the vehicle, information indicating one or more characteristics of the object. The functions may further comprise determining, using the information indicating one or more characteristics of the object, a portion of the image depicting the object. Additionally, the functions may comprise processing the portion of the image to determine a control strategy for the vehicle and providing instructions to control the vehicle based on the control strategy for the vehicle.

In still another aspect, the present application describes a control system. The control system may comprise at least one processor. The control system also may comprise a memory having stored thereon executable instructions that, upon execution by the at least one processor, cause the control system to perform functions comprising receiving, from an image-capture device coupled to a vehicle, an image comprising an object. The functions may include receiving, via one or more sources coupled to the vehicle, information indicating one or more characteristics of the object. Further, the functions may include determining, using the information indicating one or more characteristics of the object, a portion of the image depicting the object. In addition, the functions may include processing the portion of the image to determine a control strategy for the vehicle. The functions may also include providing instructions to control the vehicle based on the control strategy for the vehicle.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 3 is a flow chart of an example method for the use of detected objects in image processing.

DETAILED DESCRIPTION

Figure 1:
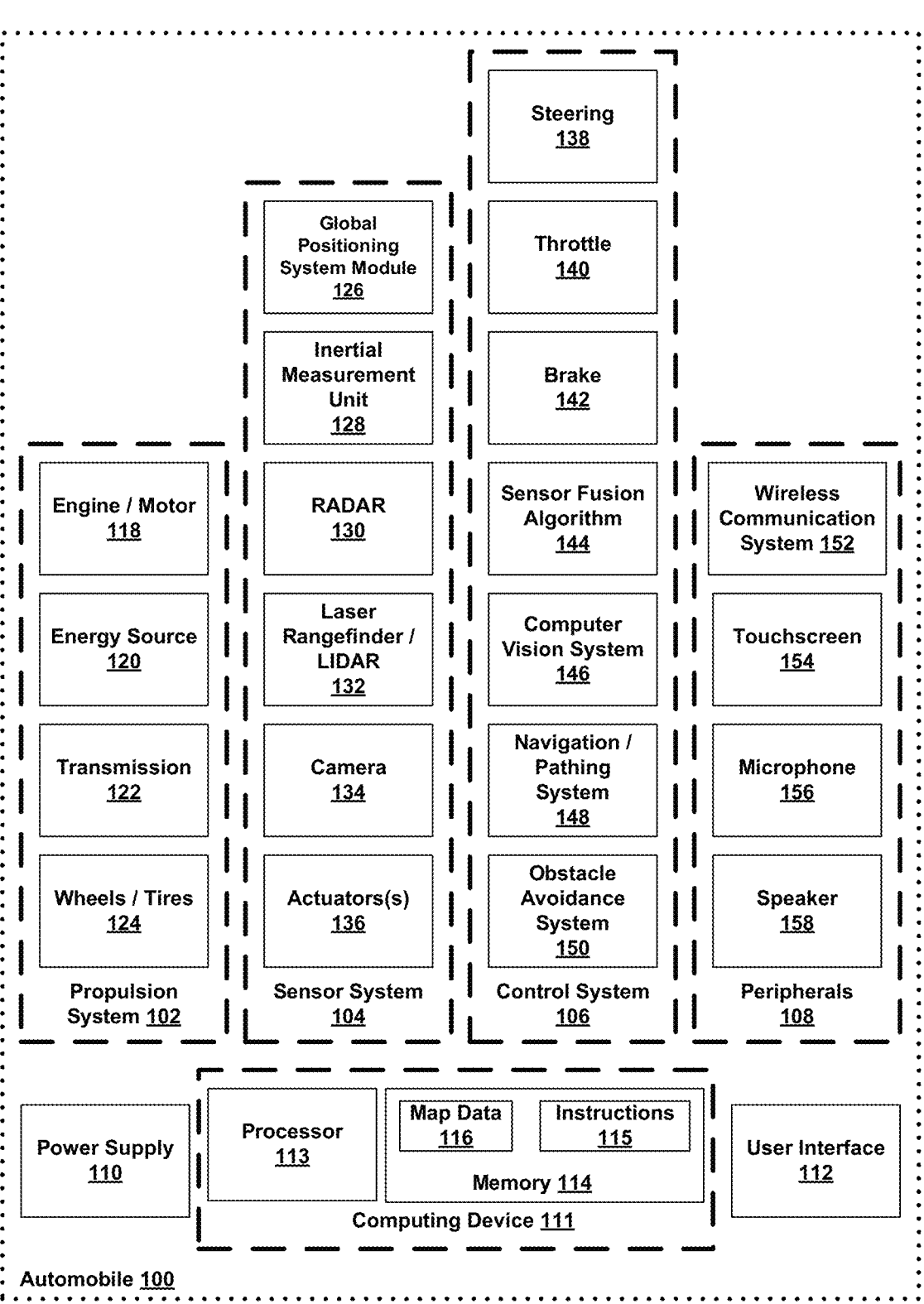
FIG. 1 is a simplified block diagram of an example vehicle, in accordance with an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

An autonomous vehicle operating on a road or other surface may rely on identifying objects within the vicinity of the vehicle in order to determine a safe trajectory or path for the vehicle to continue traveling upon. A computing device controlling the vehicle in autonomous mode may use one or more image-capture devices, such as cameras or video recorders, to capture images of objects within the surrounding environment of the vehicle. The image-capture devices may be positioned on a vehicle to capture the various angles of objects nearby the vehicle or within the upcoming path of the vehicle. The autonomous vehicle may be configured to continuously capture images of the surrounding environment in real-time.

The computing device controlling the vehicle may be configured to use resources to locate objects, such as other vehicles, within the captured images. In some examples, a computing device may process the captured images utilizing additional information provided by other sources coupled to the vehicle, such as RADAR, LIDAR, maps, and additional cameras. RADAR may use radio waves to determine a range, altitude, direction, or speed of objects. LIDAR is a light detection and ranging or laser imaging detection and ranging. The LIDAR system may use optical remote sensing technology to measure the distance to, or other properties of targets by illuminating the target with laser light and analyzing the backscattered light. The other sources may be associated or attached to the vehicle and may be controlled by one or more computing devices. The additional information may include characteristics about specific objects within the environment of the vehicle. For example, a computing device may utilize the speed and size of objects as determined by a LIDAR system using lasers or sensors in order to approximate the location of the particular objects within captured images. The computing device may also use RADAR or maps to determine locations of objects relative to the vehicle, which may assist the computing device in determining where the objects may approximately be located within an image captured of the surrounding environment. The computing device may receive other information from sources that may assist in image processing as well.

In some examples, a computing device operating a vehicle autonomously may use information from multiple sources to assist with detecting objects within the environment of the vehicle and to process images received from an image-capture device. For example, a computing device may capture an image of a nearby vehicle traveling on the same road. In order to determine various information about the vehicle (e.g., the type of vehicle or the model), the computing device may focus upon details within the image to determine specific features of the nearby vehicle. To determine portions of the image containing details about the vehicle, the computing device may use information about the speed, size, and relative location in the environment gathered by sources.

In some examples, the computing device may be configured to locate brake signals or turn signals of other vehicles within images to determine whether or not the vehicle is braking or preparing to turn. Likewise, a computing device controlling a vehicle may use a similar process to locate other objects within captured images, including but not limited to pedestrians, traffic lights, signs, animals, and speed bumps, etc.

In another example, a computing device controlling a vehicle autonomously may receive information about nearby objects from sources, which may include the approximate height, width, or length of the objects. For example, a system of lasers may be configured to measure the sizes of nearby objects. Similarly, other sources may be capable of determining the approximate distance between the autonomous vehicle and an object. The computing device may use the information to determine the location of particular objects within the captured images received from the image-capture device(s) coupled on the vehicle. Similarly, the computing device may receive information including the shapes, speed, or distance relative to the vehicle controlled by the computing device from the other sources. Other additional information may be provided by the sources on objects within the vicinity of a vehicle.

In some implementations, a computing device may use one or more transforms to determine data that allows the computing device to determine or infer the location of the objects within an image captured by an image-capture device. The transform may include a camera matrix, or other types of visual mapping from points in the real environment to the image. For example, the computing device may use a transform to determine the location of objects within an image by matching the location of points in the actual situation and the location of the same points within the image taken of the situation. Further, a computing device using transforms may factor in additional information received about objects in the environment to locate objects within images.

In addition, the computing device may use information provided from sources, such as LIDAR, RADAR, etc. to determine which objects are present in the environment but may be occluded within an image (not visible). The computing device may determine possible occlusions using predetermined information about other known objects and/or information obtained from the additional sources. For example, the computing device may analyze intersections between any estimated areas of the image that another object is positioned within and determine which object should appear in front of the other in such intersection cases. Additionally, a computing device may also determine partial occlusions, such as determining that the left side of another vehicle is likely occluded in the image since the right side is visible within captured images.

In some implementations, a computing device controlling a vehicle may use the location of objects in images as determined through using captured images and additional sources (e.g., LIDAR, RADAR) to perform further analysis on the objects or in order to determine a control strategy for operating the vehicle. For example, a computing device may use images received from an image-capture device of a nearby vehicle and use information from additional sources to determine an approximate location of specific objects of the vehicle within the image. The computing device may use the image processing to further determine features of the vehicle, such as the license plate number, or if brake lights or a turn signal is being used. The computing device may further determine a control strategy based on information gathered from the image processing. For example, the computing device may determine safe paths for travel depending on the information about surrounding objects in the environment of the vehicle.

In some examples, the computing device may be configured to control the vehicle through a vehicle control system. An example vehicle control system may be implemented in or may take the form of a vehicle. Alternatively, a vehicle control system may be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Further, an example system may take the form of a non-transitory computer-readable medium, which has program instructions stored thereon that are executable by at least one processor to provide the functionality described herein. An example system may also take the form of a vehicle or a subsystem of a vehicle that includes such a non-transitory computer-readable medium having such program instructions stored thereon.

I. Example Vehicle

Referring now to the Figures, FIG. 1 is a simplified block diagram of an example vehicle 100, in accordance with an example embodiment. Components coupled to or included in the vehicle 100 may include a propulsion system 102, a sensor system 104, a control system 106, peripherals 108, a power supply 110, a computing device 111, and a user interface 112. The computing device 111 may include a processor 113, and a memory 114. The computing device 111 may be a controller, or part of the controller, of the vehicle 100. The memory 114 may include instructions 115 executable by the processor 113, and may also store map data 116. Components of the vehicle 100 may be configured to work in an interconnected fashion with each other and/or with other components coupled to respective systems. For example, the power supply 110 may provide power to all the components of the vehicle 100. The computing device 111 may be configured to receive information from and control the propulsion system 102, the sensor system 104, the control system 106, and the peripherals 108. The computing device 111 may be configured to generate a display of images on and receive inputs from the user interface 112. In other examples, the vehicle 100 may include more, fewer, or different systems, and each system may include more, fewer, or different components. Additionally, the systems and components shown may be combined or divided in any number of ways.

The propulsion system 102 may be configured to provide powered motion for the vehicle 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Sterling engine. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the vehicle 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of vehicle 100 could be configured in various formats, including a unicycle, bicycle/motorcycle, tricycle, or car/truck four-wheel format. Other wheel/tire formats are possible as well, such as those including six or more wheels. The wheels/tires 124 of vehicle 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the vehicle 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the vehicle 100 (e.g., an $O_2$ monitor, a fuel gauge, an engine oil temperature, etc.). Other sensors are possible as well.

The GPS module 126 may be any sensor configured to estimate a geographic location of the vehicle 100. To this end, the GPS module 126 may include a transceiver configured to estimate a position of the vehicle 100 with respect to the Earth, based on satellite-based positioning data. In an example, the computing device 111 may be configured to use the GPS module 126 in combination with the map data 116 to estimate a location of a lane boundary on road on which the vehicle 100 may be travelling on. The GPS module 126 may take other forms as well.

The IMU 128 may be any combination of sensors configured to sense position and orientation changes of the vehicle 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the vehicle 100 is located using light. Generally, LIDAR is an optical remote sensing technology that can measure distance to, or other properties of, a target by illuminating the target with light. As an example, the LIDAR unit 132 may include a laser source and/or laser scanner configured to emit laser pulses and a detector configured to receive reflections of the laser pulses. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, The LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the vehicle 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the vehicle 100 illuminates an object in the environment with a predetermined light pattern, such as a grid or checkerboard pattern and uses the camera 134 to detect a reflection of the predetermined light pattern off the object. Based on distortions in the reflected light pattern, the vehicle 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the vehicle 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the vehicle 100.

The throttle 140 may be any combination of mechanisms configured to control the operating speed and acceleration of the engine/motor 118 and, in turn, the speed and acceleration of the vehicle 100.

The brake unit 142 may be any combination of mechanisms configured to decelerate the vehicle 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the vehicle 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the vehicle 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the vehicle 100. The navigation and pathing system 148 may additionally be configured to update the driving path dynamically while the vehicle 100 is in operation. In some examples, the navigation and pathing system 148 may be configured to incorporate data from the sensor fusion algorithm 144, the GPS module 126, and one or more predetermined maps so as to determine the driving path for the vehicle 100.

The obstacle avoidance system 150 may be any system configured to identify, evaluate, and avoid or otherwise negotiate obstacles in the environment in which the vehicle 100 is located.

The control system 106 may additionally or alternatively include components other than those shown.

Peripherals 108 may be configured to allow the vehicle 100 to interact with external sensors, other vehicles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other vehicles, sensors, or other entities, either directly or via a communication network. To this end, the wireless communication system 152 may include an antenna and a chipset for communicating with the other vehicles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the vehicle 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the vehicle 100. Similarly, the speakers 158 may be configured to output audio to the user of the vehicle 100.

The peripherals 108 may additionally or alternatively include components other than those shown.

The power supply 110 may be configured to provide power to some or all of the components of the vehicle 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the vehicle 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various vehicle functions, including any of the functions or methods described herein.

The components of the vehicle 100 could be configured to work in an interconnected fashion with other components within and/or outside their respective systems. To this end, the components and systems of the vehicle 100 may be communicatively linked together by a system bus, network, and/or other connection mechanism (not shown).

Further, while each of the components and systems is shown to be integrated in the vehicle 100, in some examples, one or more components or systems may be removably mounted on or otherwise connected (mechanically or electrically) to the vehicle 100 using wired or wireless connections.

The vehicle 100 may include one or more elements in addition to or instead of those shown. For example, the vehicle 100 may include one or more additional interfaces and/or power supplies. Other additional components are possible as well. In these examples, the memory 114 may further include instructions executable by the processor 113 to control and/or communicate with the additional components.

Figure 2:
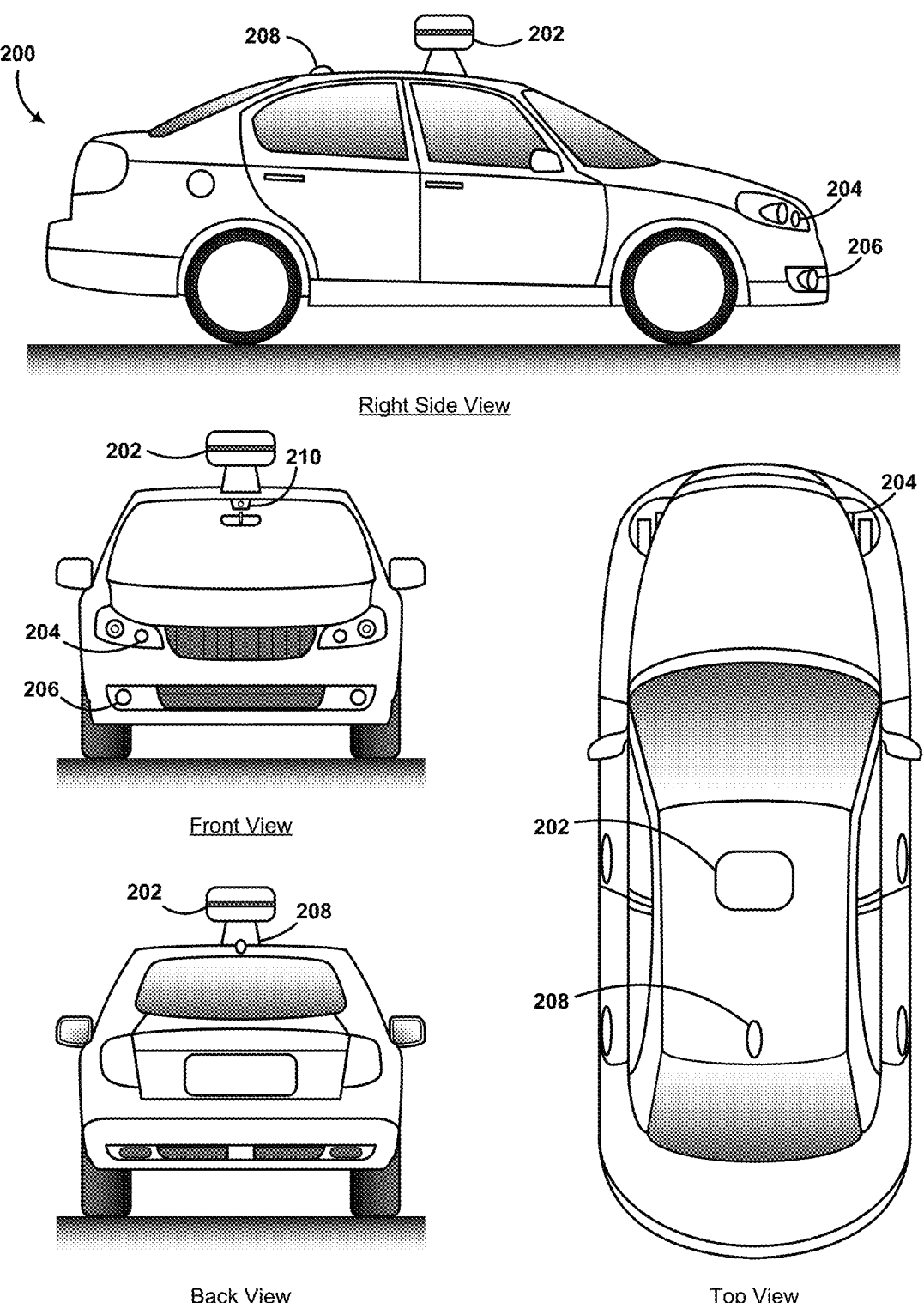
FIG. 2 illustrates an example vehicle, in accordance with an example embodiment.

FIG. 2 illustrates an example vehicle 200, in accordance with an embodiment. In particular, FIG. 2 shows a Right Side View, Front View, Back View, and Top View of the vehicle 200. Although vehicle 200 is illustrated in FIG. 2 as a car, other examples are possible. For instance, the vehicle 200 could represent a truck, a van, a semi-trailer truck, a motorcycle, a golf cart, an off-road vehicle, or a farm vehicle, among other examples. As shown, the vehicle 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the vehicle 200, in some examples the sensor unit 202 may be mounted elsewhere on the vehicle 200, either inside or outside the vehicle 200. Further, while only three sensor units are shown, in some examples more or fewer sensor units may be included in the vehicle 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the vehicle 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other vehicles, sensors, or other entities, either directly or via a communication network as described above with respect to the wireless communication system 152 in FIG. 1. While the wireless communication system 208 is shown to be positioned on a roof of the vehicle 200, in other examples the wireless communication system 208 could be located, fully or in part, elsewhere.

The camera 210 may be any camera (e.g., a still camera, a video camera, etc.) or image-capture device configured to capture images of the environment in which the vehicle 200 is located. To this end, the camera 210 may take any of the forms described above with respect to the camera 134 in FIG. 1. While the camera 210 is shown to be mounted inside a front windshield of the vehicle 200, in other examples the camera 210 may be mounted elsewhere on the vehicle 200, either inside or outside the vehicle 200.

The vehicle 200 may include one or more other components in addition to or instead of those shown.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

II. Example Method

FIG. 3 is a flow chart of a method 300 for using detected objects for image processing. Other example methods for using detected objects for image processing may exist as well.

The method 300 may include one or more operations, functions, or actions as illustrated by one or more of blocks 302-310. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

At block 302, the method 300 includes receiving, from an image-capturing device coupled to a vehicle, an image comprising an object. In some implementations, a computing device may be configured to receive images from an image-capturing device. The computing device may be currently controlling a vehicle or may be configured to control a vehicle autonomously or some of the systems of the vehicle, such as the examples shown in FIGS. 1-2. Further, the computing device may receive images wirelessly or through a wired route. In other examples, other devices may receive the images from an image-capturing device. The images may be stored in various types of memory or within a cloud.

The images captured by an image-capturing device may display particular ranges of the environment of the vehicle, or aimed at particular objects. In some implementations, the images may depend on the placement and orientation of the image-capture device on the vehicle. The images may include multiple objects or may focus upon a single object. In addition, the images may vary in size and quality and may be two-dimensional or three-dimensional. Similarly, the computing device may receive the images in real-time. The images may be stored in memory or may be volatile, existing only for a period of time.

An image-capture device may be a camera, video recorder, or any type of device capable of capturing images. The image-capture device may be configured to record or capture images that can be stored directly, transmitted to another location, or both. In addition, the image-capture may be configured to capture still photographs or moving images, such as in videos. The image-capturing device may be part of a system associated with a computing device and may be coupled to the vehicle in a variety of places on the vehicle. For example, one or more image-capture devices may be built into the bumper of the vehicle or may be part of the windshield.

The computing device controlling a vehicle autonomously may continuously receive images from a system of image-capture devices or may periodically receive the images. The images may be used to analyze the environment surrounding the vehicle, including reading signs, analyzing potential hazards and objects, and other purposes.

At block 304, the method 300 additionally includes receiving, via one or more sources coupled to the vehicle, information indicating one or more characteristics of the object. A computing device associated with a vehicle may be configured to use additional sources to receive information indicating characteristics of objects in the vicinity of the vehicle. The computing device may be the same computing device receiving the images as discussed above or a different computing device that may be in communication with the computing device controlling the vehicle.

Examples of sources may include RADAR, LIDAR, additional cameras, maps, GPS, sensors, or additional sources. The sources may be coupled to the vehicle or may be associated with the vehicle without a physical connection. The sources may transmit information wirelessly or through a wired-connection. Further, the sources may be configured to work in a system or may be configured to operate in separate systems. A computing device may be configured to all of the sources, a portion of the sources, or none of the sources. Different computing devices may control different sources. The sources may communicate via a wired-link, wirelessly, or within a cloud, for example. In addition, different sources may be configured to determine different characteristics of the objects in the surrounding environment of a vehicle.

The computing device may receive information indicating characteristics of objects nearby the vehicle from one or more sources. For example, a computing device may receive information, such as whether an object is moving or stationary, a longitudinal speed of the object, a lateral speed of the object, and the direction of motion of the object and/or a size of the object. In addition, a computing device may receive information about the respective position of the object on a road or other surface which the vehicle is traveling.

In some implementations, additional sources coupled to an autonomous vehicle may provide the computing device with perspective and factors to analyze about the environment and objects surrounding the vehicle. The information from the additional sources may be used during image processing. In additional examples, a computing device may also receive information about the environment, such as weather information or an overall traffic status on a specific road. A computing device may receive additional information from sources about the environment or objects within the environment as well.

In one implementation, a computing device may be configured to receive information from lasers coupled to the vehicle. The LIDAR may be configured to emit light through a process of optical amplification based on the stimulated emission of electromagnetic radiation. Further, a computing device may use LIDAR to mark target objects, measure ranges, and speeds or for other purposes. LIDAR may be useful to determine distances between a vehicle and objects. Other information may be gathered by a computing device using LIDAR as well. In addition, a computing device may use LIDAR or a similar system as discussed above to determine information about the characteristics one or more objects within the vicinity of the vehicle.

Similarly, a computing device may be configured to use RADAR in addition to other sources to gather information about an object. As discussed above, a computing device controlling a vehicle autonomously may use RADAR to determine information on an object, such as a range, altitude, direction, speed, or other information associated with the object. In addition, RADAR may be used by a computing device rather than other types of sources. Further, a computing device may receive additional information about an object from a GPS system associated with the vehicle. GPS may be used to gather location information about objects relative to the position of the vehicle. A computing device may receive a combination of information from multiple sources, such as RADAR and GPS.

In some implementations, a computing device may use additional cameras to gain information about an object within the vicinity of the vehicle. For example, a computing device may use cameras that are positioned at different points on the vehicle to capture images of an object from different angles. In addition, a computing device may use cameras that are configured to take more or less focused images, which may provide variances for analyzing a main image. The various cameras may have different lens.

In other implementations, a computing device controlling a vehicle autonomously may use other types of sensors or sources to receive information about the surrounding environment of the vehicle, including more specific information about objects or the environmental in general.

At block 306, the method 300 further includes determining by a computing device, using the information indicating one or more characteristics of the object, a portion of the image depicting the object. A computing device controlling a vehicle autonomously may process the images received from the image-capture device in order to develop a control strategy. Processing the images may include using one or more transforms to map locations from three-dimension objects in the environment to a proportional two-dimension format. The images may contain some objects of interest to the computing device and thus, a computing device may be configured to focus upon the objects within the images for further analysis. In some implementations, the computing device may use the information received from the various sources to further process the images and focus upon portions of the image with the objects of interest.

In some implementations, a computing device may be configured to focus upon particular portions of received images that contain objects of interest to the computing device. The computing device may be able to further analyze an image of the environment by locating objects of interest within the image. An autonomous vehicle may adjust a control strategy based on objects within the local environment of the vehicle. For example, the autonomous vehicle may capture an image of a traffic signal. The autonomous vehicle may process the image and determine that the vehicle may need to stop in order to obey the current state of the traffic signal.

In some examples, the computing device may receive information from sources about nearby objects prior to receiving images from an image-capture device. Similarly, the computing device may receive images prior to receiving information about objects within the image. Thus, the computing device may process images to determine information about surroundings, including objects in the vicinity of the vehicle, which may be used for operating autonomously.

In some implementations, a computing device may use the information about nearby objects received from the sources to process images. For example, the computing device may use information from the sources to determine the approximate locations of the objects within the image. The computing device may use the information received from sources to focus upon a portion or portions of the image that contain the objects of interest to the computing device. For example, the computing device may factor the characteristics about the size of an object relative to surrounding entities during determining the location of the object within the image. The portion of the image may be the same size of the image captured by the image-capture device or may be smaller than the image. A computing device may use the various information received from the different types of sources to focus upon objects in the image or different portions of the image. The combination of information from multiple sources may provide a computing device with more options and information than information from a single source, such as in an image.

In some implementations, the computing device may determine a portion of the image depicting a specific object by determining that one or more pixels within the image match information indicating characteristics of the object received from the sourced coupled to the vehicle. In addition, the computing device or another device may be configured to perform a translation of a location of the object in the actual environment to one or more corresponding pixels in images received from an image-capture device.

The computing device may use some or all of the information provided by the different sources to locate an object within an image captured of the vicinity of the vehicle quickly. For example, the computing device may use the information from other sources to hypothesize approximate locations for objects within the image captured by the image-capture device of the vehicle. A computing device may use a transform between the location of points in the environment and the location of the same points within the image taken by the autonomous vehicle to determine where each or some of the objects should appear in the image. The transform may be a three dimension rotation and/or translation from the real environment to the coordinates of the image-capture device coordinates followed by a projection transform dependent on the focal length of the image-capture device and the resolution of any sensors. In some instances, the transform may map points of three-dimensional objects in the environment to a two-dimensional plane within the image. The transform may apply a camera projection matrix, which describes mapping of a pinhole camera from three-dimensional points in the real environment to two-dimensional points in an image. Further, the computing device may apply extrinsic calibration through rotation and translation and may apply intrinsic transformation through projection. In an example, the computing device may translate or rotate elements in the images as well. In some instances, the output from the computing device using a transform may include data about pixels within the image that correspond to objects within the real environment.

In some implementations, a computing device controlling a vehicle autonomously may be configured to determine if some objects are occluded (not visible) in the image based on other known objects and/or information received from sources. A computing device analyzing the surrounding environment of a vehicle through images may capture objects in front of other objects. The computing device may use the approximate object locations or other information to determine which objects may be occluded. For example, the computing device may focus on intersections between areas of the image that are filled by an object and determine which object should appear in front of the other in such intersections in cases where multiple objects may overlap in a two-dimensional image. A computing device may also use occlusion reasoning to detect partial occlusions. For example, a computing device may determine that the left side of a car is likely occluded in an image since the right side of the vehicle is visible.

Thus, a computing device may be configured to use information received from sources other than the image-capture device to process images taken by the image-capture device of the surrounding environment of the vehicle.

At block 308, the method 300 includes processing the portion of the image to determine a control strategy for the vehicle. The computing device of vehicle may be configured to process the portion of the image in order to determine a control strategy for the vehicle. The computing device may determine a control strategy based on the objects in the vicinity of the vehicle. For example, the computing device controlling a vehicle may determine that another vehicle traveling in front of the vehicle is braking and in response, either brake or change lanes to avoid a collision. During processing the portion of the image to determine a control strategy, the computing device may determine one or more features of objects using the information received from sources and images. For example, the computing device may determine if a nearby vehicle is using brake signals or turn signals through processing the image. In addition, the computing device may use information from the sources with or without the image to determine the color of an object or a license plate number, for example. Other example features may be determined as well.

A control strategy may represent the future implementations the vehicle and may comprise various instructions or rules associated with traffic interaction in various driving contexts. The control strategy, for example, may comprise rules that determine a speed of the vehicle, steering angle, and a lane that the vehicle may travel on while taking into account safety and traffic rules and concerns (e.g., vehicles stopped at an intersection and windows-of-opportunity in yield situation, lane tracking, speed control, distance from other vehicles on the road, passing other vehicles, and queuing in stop-and-go traffic, and avoiding areas that may result in unsafe behavior such as oncoming-traffic lanes, etc.).

In an example, a given control strategy may comprise a program or computer instructions that characterize actuators controlling the vehicle (e.g., throttle, steering gear, brake, accelerator, or transmission shifter) based on the modified trajectory. The given control strategy may include action sets ranked by priority, and the action sets may include alternative actions that the vehicle may be configured to take to accomplish a task (e.g., driving from one location to another). The alternative actions may be ranked based on the modified trajectory, and respective weights assigned to a respective lateral distance determined with respect to a given object, for example.

In another example, multiple control strategies (e.g., programs) may continuously propose actions to the computing device. The computing device may be configured to decide which strategy may be selected based on a weighted set of goals (e.g., maintaining determined lateral distances, safety, speed, smoothness of the modified trajectory, etc.), for example. Based on an evaluation of the weighted set of goals, the computing device, for example, may be configured to rank the multiple control strategies and respective action sets and determine a given control strategy and a respective action set based on the ranking. Using image processing and information on detected objects, a computing device may effectively determine safe control strategies for real-time navigation.

At block 310, the method 300 includes providing instructions to control the vehicle based on the control strategy for the vehicle. The control system of the vehicle may comprise multiple control strategies that may be predetermined or adaptive to changes in a driving environment of the vehicle.

The computing device may store instructions to control the vehicle in various types of memories or within a cloud.

The computing device may provide the instructions wirelessly or through a wired-link. In addition, the instructions may be configured in various formats and may be executed by different types of processors and devices.

In some implementations, a computing device performing the method 300 may further determine, based on the portion of the image depicting the object, one or more features of the object. For example, the computing device may determine the location of a turn signal of another vehicle within an image and further determine if the turn signal is in use. Similarly, the computing device may determine the color of an object, size of an object, or a license plate number based on using other sources and a captured image. For example, a computing device may capture an image of a nearby vehicle and further determine using information received from other sources, the model of the vehicle or other information about the nearby vehicle. A computing device may also use other sources to determine the information on signs or to recognize the placement of traffic signals or other objects in the images, for example. For example, LIDAR coupled to the vehicle may be configured to detect distances between the vehicle and objects, assisting in the computing device in determining approximate locations for the objects relative to the vehicle in the images captured by the image-capture device. Similarly, the computing device may use process the image and use the distance information provided by the LIDAR in determining a control strategy.

A computing device performing the method 300 may extract image-based features of objects without relying only upon images. The information from other sources may allow the computing device to quickly determine the approximate locations of objects within an image and may lower the amount of processing power required from the computing device. In one example implementation, the computing device may be configured to devote more resources or focus upon a smaller fraction of the image, such as an intersection containing multiple objects. The computing device may further focus upon smaller portions of the already fraction of the image to further determine information about objects within the original image.

In one implementation, a computing device may use other known objects to estimate or determine which objects may be included in an image captured of the surrounding environment of the vehicle. In the example, a device may project three-dimensional points into an image received from an image-capture device in order to determine if objects may be in front or behind each other. For example, a computing device may determine that a traffic light 100 meters in front of the vehicle controlled by the computing device and a vehicle 20 meters ahead may overlap so that the vehicle 20 meters ahead is blocking portion of the traffic light. Using some form of occlusion reasoning, a computing device may determine that the closer object (vehicle 20 meters ahead) should be the one in the image. The computing device may focus on intersections to determine which objects should appear in the front within images.

III. Example Implementations

FIGS. 4A-4D illustrate various example scenarios that a computing device in control of a vehicle may execute method 300 or a similar method for using detected objects for image processing. The example scenarios shown in the FIGS. 4A-4D serve merely as illustrations and may vary in different implementations. Similarly, other example situations or scenarios may exist as well. In the various examples shown in FIGS. 4A-4D, a computing device associated with a vehicle, whether in control or assisting the driver, may use one or more image-capture devices to capture images of the relative environment of the vehicle. For example, the image-capture device may be built into the grill or front plate of the vehicle and capture images of the space including objects within the front path of the vehicle. Similarly, the image-capture devices may be placed in various places on the vehicle and may be configured to capture different portions of the environment around the vehicle. The vehicles discussed above in FIGS. 1-2 may also be used.

Although the computing device may be capable of determining objects within an image received from an image-capture device, the process may require time, and/or resources from the computing device or other devices. Thus, as discussed above, the computing device may use additional information received from the other sources coupled or associated with the vehicle, such as RADAR, LIDAR, other cameras, GPS, or sensors, in order to process the image. The computing device may receive information about various characteristics of the objects or the environment surrounding the vehicle from the other sources. For example, the computing device may receive information indicating whether an object within the vicinity of the vehicle is moving or stationary, a longitudinal speed of the object, a lateral speed of the object, a direction of motion of the object, a size of the object, and/or a respective position of the object on the road of which the vehicle is also traveling along. In addition, the computing device may determine other information about an object. Based on the information received from other sources, the computing device may process images received from the image-capture device. The computing device may be configured use the characteristics about objects to be able to determine a portion or portions of the image depicting the objects for the computing device to analyze. For example, the computing device may use the assisted image processing to find the visual features within the image that reveal information about objects. A computing device may use image processing to locate brake or turn signals, identify object colors or models, or other information. Similarly, the computing device may be configured to determine approximate locations of objects within the image based on information received from other sources coupled to the vehicle.

In some examples, the computing device may receive information from the objects through a wired-connection or wirelessly.

Figure 4A:
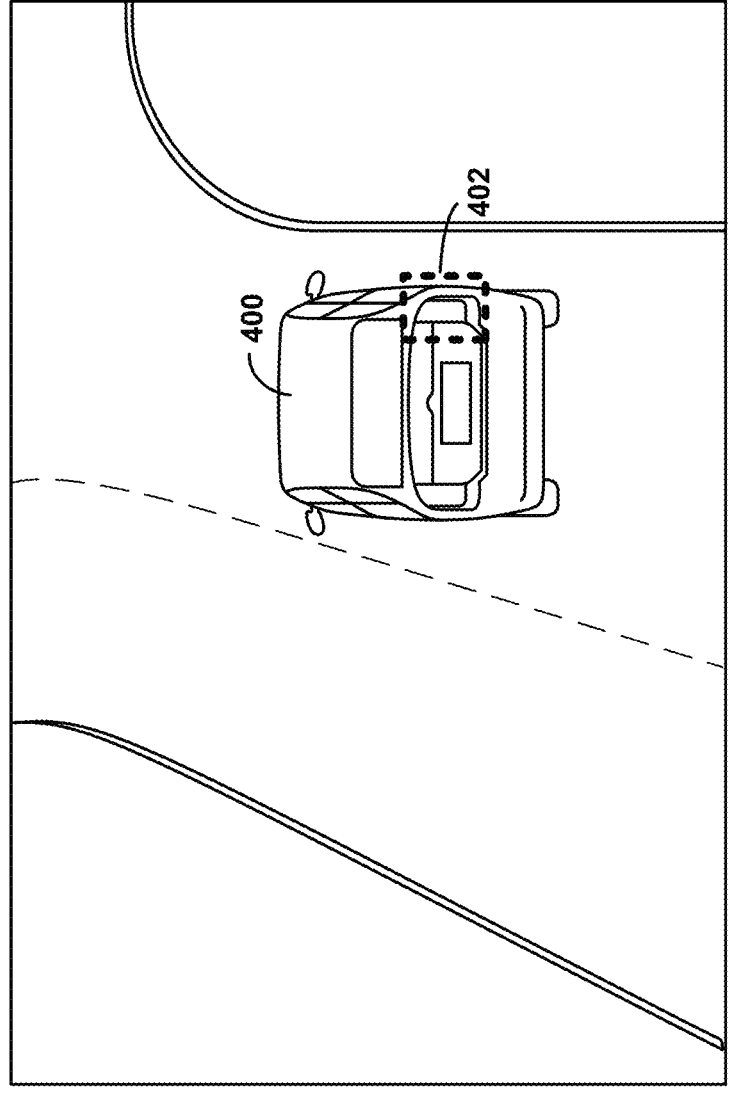
FIG. 4A illustrates an example scenario for using detected objects in image processing in order to determine if a vehicle is turning.

FIG. 4A illustrates an example scenario that shows a computing device of a vehicle using additional sources, such as RADAR, LIDAR, sensors, GPS or additional cameras, to determine if a nearby vehicle traveling in front of the vehicle controlled autonomously is using a turn signal. In similar scenarios, a computing device may use additional sources to assist in processing images in order to locate the license plate number, the color, or other information from the images about the other vehicle. Other example scenarios may exist as well.

FIG. 4A depicts a vehicle 400 traveling along a two lane road. As the road extends in the distance, the road also extends into a possible upcoming turn that provides a route for a vehicle to turn off the two lane road. In the example scenario, the vehicle 400 may continue on the road straight or may change orientation and turn right onto the new road ahead. For illustration purposes, a vehicle traveling behind the vehicle 400 may be controlled autonomously by a computing device. The computing device may use one or more sources to detect the vehicle 400 and receive information about the vehicle 400. For example, the computing device may receive various characteristics about the vehicle 400, including but not limited to the speed of vehicle 400, the size of vehicle 400, or the relative distance between vehicle 400 and the autonomous vehicle controlled by the computing device. The computing device may receive other information about the vehicle 400 as well.

As shown in FIG. 4A, the computing device controlling the vehicle autonomously traveling behind vehicle 400 may be configured to capture images of vehicle 400 and use the information received from additional sources to process the captured images. For example, the computing device may determine the portion of the image that focuses upon the turn signal of vehicle 400 to determine whether the turn signal is on or off. For illustration purposes, box 402 represents an outline that may be the portion of images that the computing device of the autonomous vehicle behind vehicle 400 may focus upon in order to determine whether or not vehicle 400 is going to execute a right turn or continue traveling straight. During processing captured images, the computing device may use the additional information received from other sources, such as sensors, LIDAR, or GPS, may allow the computing device to approximately locate and focus upon the turn signals within images captured of vehicle 400. For example, LIDAR may provide the computing device with characteristics of the vehicle 400, including the distance between vehicle 400 and the autonomous vehicle. Sources such as LIDAR, RADAR, sensors, and GPS may provide information may include the relative size or speed of vehicle 400. Other information may be gathered about vehicle 400 that may assist during image processing as well.

Indeed, box 402 serves merely as an example within the illustration and may not be visible in the real world. Further, the size of box 402 may vary in other examples. A computing device may focus on larger or smaller portions of images to gather information about other vehicles or objects. Additional boxes may be shown in other examples representing other portions of an image that a computing device may use additional sources to focus upon.

Figure 4B:
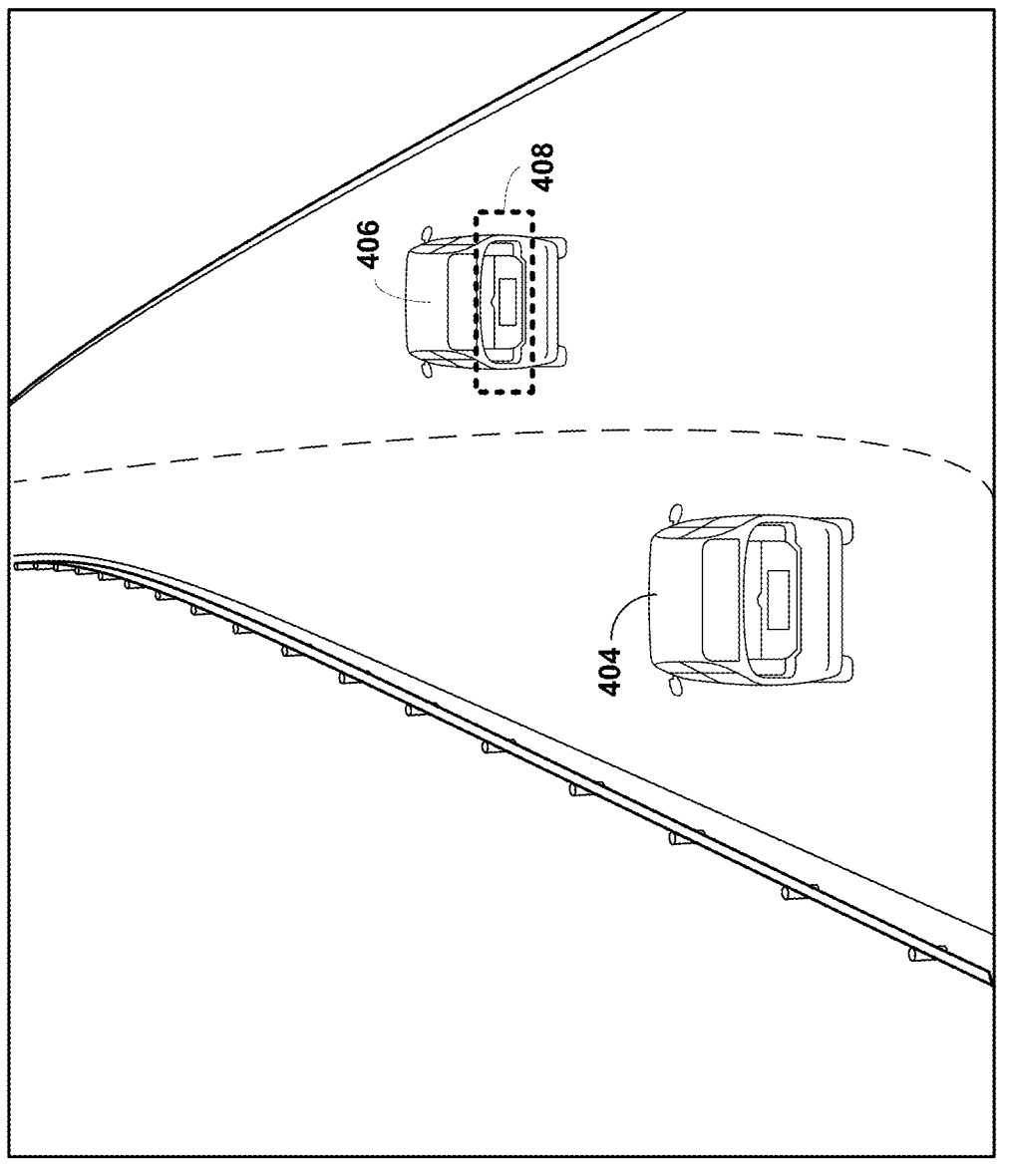
FIG. 4B illustrates an example scenario for using detected objects in image processing in order to determine the potential actions of a nearby vehicle.

Similar to FIG. 4A, FIG. 4B illustrates an additional example scenario that shows a computing device of a vehicle using additional sources, such as RADAR, LIDAR, sensors, or additional cameras, to determine that a vehicle traveling nearby may be braking or using a turn signal. Other additional sources may be used as well.

In the example scenario shown in FIG. 4B, a vehicle 404 may be controlled by a computing device and operating autonomously. In some implementations, the computing device of vehicle 404 may be configured to use one or more additional sources to determine if the nearby vehicle 406 in the next lane is using brakes lights 408 or turn signals. The computing device of vehicle 404 may be constantly updating a control strategy in order to allow the safe travel of vehicle 404. Therefore, as the vehicle 404 approaches and/or is passed by vehicle 406, the computing device may be configured to determine a proper control strategy that reacts to the presence of nearby vehicle 406.

Similar to FIG. 4A, the computing device 404 may capture images using an image-capture device of the surrounding environment, which may include vehicle 406. In order to focus on features or specific objects within the images, the computing device may use additional sources to receive information about the environment including vehicle 406. For example, the computing device may receive information from LIDAR or sensors that provide a relative distance between vehicle 406 and vehicle 404. Similarly, the computing device may receive other information from sources, such as the speed or size of vehicle 406, or the relative distance of vehicle 406 from other points in the environment. Other information may be received by the computing device as well.

Using the information from additional sources, the computing device may process images captured to focus on specific details of vehicle 406. The computing device may be configured to estimate an approximate location of the brake signals of vehicle 406 within images captured using the information about the speed, size, or relative distance received from sources. By focusing upon a smaller portion of the captured images, the computing device may be configured to quickly locate the brake signals on vehicle 406 to determine whether the vehicle 406 is braking. The information gathered from other sources by the computing device may assist in the processing of images captured of the environment surrounding the vehicle controlled by the computing device.

Similar to FIG. 4A, FIG. 4B depicts a box 408 that represents a portion of an image or images that a computing device may use one or more sources to determine. The computing device may be configured to process images of the vehicle 406 and use other sources to narrow the image to a portion covered by box 408. The computing device may use information gathered about the size of vehicle 406 or the positioning of the vehicle 406 relative to the autonomous vehicle in order to find visual features within the image that correspond to brake lights of vehicle 406. The computing device may use the information within a transformation that projects points from the image-capture device into the environment and points from the environment into the images. Similarly, the computing device may use camera calibration or projection and re-projection to determine locations of objects within images. The additional information may contribute to developing matrices that allow the computing device to match objects in the nearby environment to points within the images. The box 408 serves merely for illustration reasons and may not be visible in the real environment.

In some examples, the information received from RADAR or LIDAR may help the computing device determine the position of objects within the images. Other entities or sources connected to the vehicle may assist with image processing.

Figure 4C:
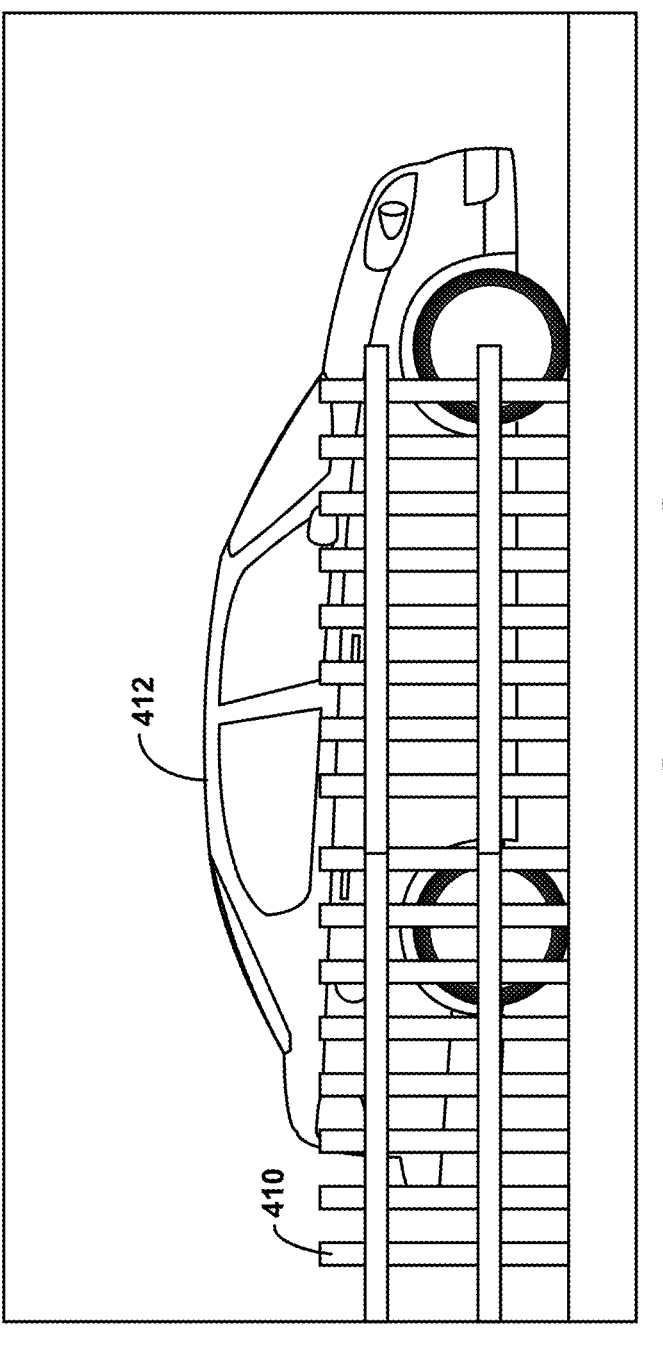
FIG. 4C illustrates an example scenario for using detected objects in image processing to determine if an object is partially occluded.

FIG. 4C illustrates an additional example scenario that shows a computing device of a vehicle using additional sources, such as RADAR, LIDAR, maps, or additional cameras, to determine that portions of a vehicle traveling nearby has pieces occluded by a fence. FIG. 4C depicts a fence 410 and a vehicle 412 shown behind the fence 410. Portions of the vehicle 412 are occluded by the fence 410 from the point of view shown by the illustration.

In the example, a computing device may be operating a vehicle in autonomous mode and maybe using a system of image-capture devices. Similar to the examples illustrated in FIGS. 4A-4B, a computing device controlling a vehicle nearby the fence 410 and vehicle 412 may use additional sources to assist in image processing and determining that portions of vehicle 412 may be occluded by the fence 410.

In the example, an autonomous vehicle is in the vicinity of fence 410 and vehicle 412 although the FIG. 4C does not depict the vehicle within the image. For positional purposes, the fence 410 may be positioned between the autonomous vehicle and the vehicle 412 illustrated in the FIG. 4C. The computing device controlling the autonomous vehicle may receive images from an image-capture device that appears as shown in FIG. 4C or similar to the example showing vehicle 412 is behind the fence 410. The computing device may use information gathered from other sources to determine whether the fence 410 should be in front of or behind the vehicle 412 in images captured. The computing device may use the information gathered from additional sources to determine at the overlap intersections which object, the fence 410 or the vehicle 412, should appear in front in images. For example, the computing device may compare the relative distances between the autonomous vehicle and the fence 410 and the autonomous vehicle and the other vehicle 412. The computing device would find that the fence 410 is closer to the autonomous vehicle and therefore, should appear in front of the vehicle 412 within images. Similarly, the autonomous vehicle may use LIDAR to detect the closer object. In other examples, the autonomous vehicle may use sensors to detect that the fence 411 is closer.

Other information may be gathered from using the additional sources and images captured. The computing device may compare intersections within the image or use other information from sources to determine the proper order of objects within an image.

In the example, the computing device or another entity may project the three-dimensional points of the environment onto the image to determine the location of objects within the image. However, some of the objects may be occluded, such as portions of vehicle 412 behind the fence 410. The computing device may project both at intersections and determine which object should be shown on top within the image. The computing device may use information from LIDAR or sensors that provide that the fence 410 is closer to the autonomous vehicle than the other vehicle 412. RADAR may be used in a similar manner to inform the computing device that the fence 410 is in front of vehicle 412 from this angle, for example.

In similar situations, a computing device of an autonomous vehicle may determine other partial or full occlusions. Other examples may exist as well.

Figure 4D:
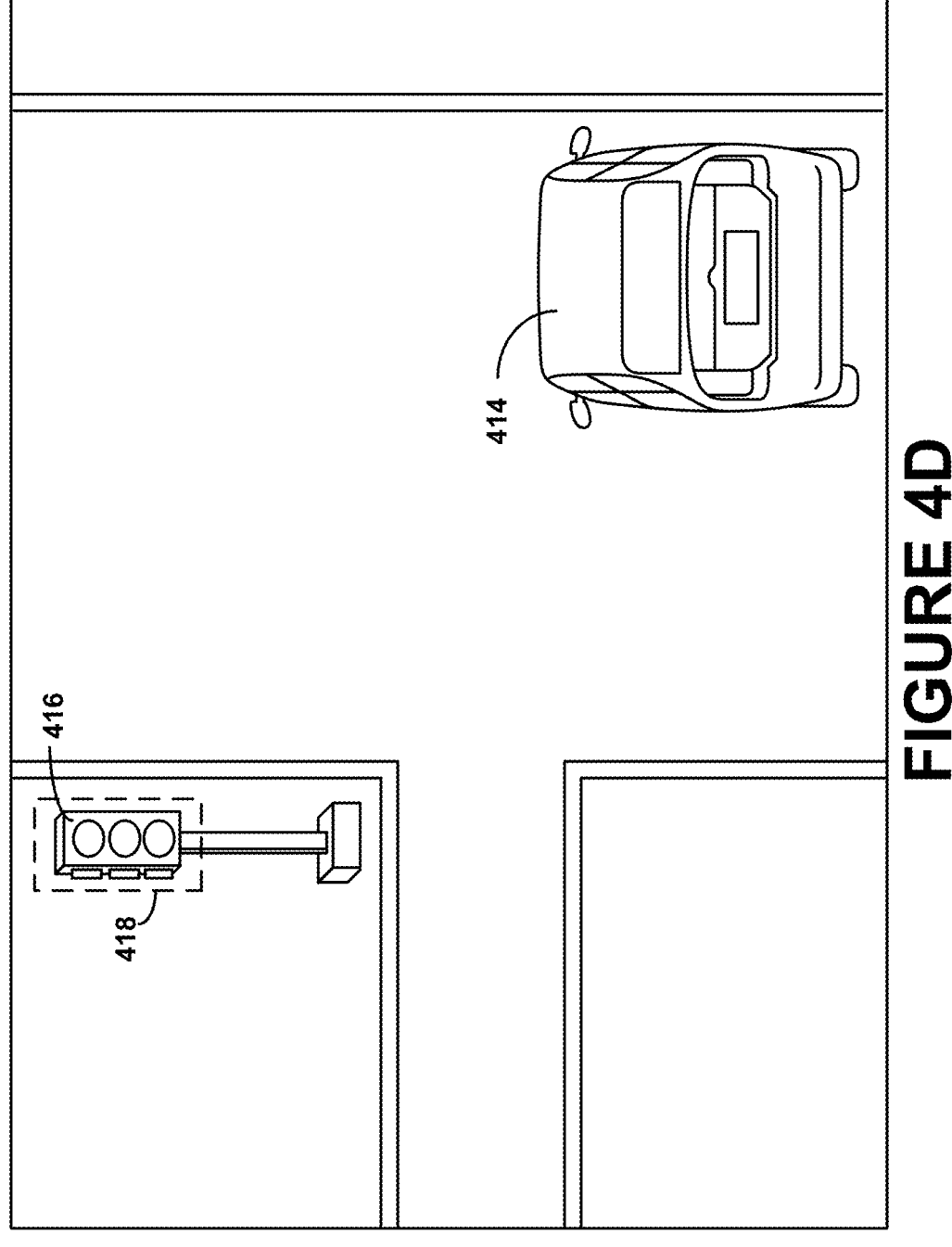
FIG. 4D illustrates an example scenario for using detected objects in image processing to determine the state of a traffic signal.

FIG. 4D illustrates an additional example scenario that shows a computing device of a vehicle using one or more additional sources to locate and determine information about a traffic signal. FIG. 4D depicts an autonomous vehicle 414 and a traffic signal 416. In addition, similar to the other FIGS. 4A-4B, FIG. 4D depicts a box 418 that illustrates a possible portion of an image that autonomous vehicle 414 may use additional sources to focus upon within images taken of the general environment surrounding vehicle 414.

In the example scenario, a computing device may be controlling the vehicle 414 and may use a camera or another image-capture device to capture images of the environment of the vehicle in real-time as discussed above. A number of the images may include the traffic signal 416, but may not be focused upon the traffic signal 416 specifically. Thus, the computing device of vehicle 414 may use one or more additional sources to determine more information about the traffic signal 416. Using the additional information from the sources, the computing device may be able to focus upon a portion of the images captured containing the traffic signal 416 as represented by box 418. The box 418 around the traffic signal 416 may vary in size and may even focus on a particular signal. Similarly, the box 418 is for illustration purposes and may not exist in the real environment.

In one implementation, the computing device operating vehicle 414 may receive information from the traffic signal 416 wirelessly. The information received wirelessly from the traffic signal 416 may be used to simplify processing images containing the traffic signal. For example, the computing device may be configured to use the information received wirelessly from the traffic signal 416 to determine an approximate location of the traffic signal 416 within an image captured for vehicle. Likewise, the computing device of an autonomous or semi-autonomous vehicle may receive information wirelessly from other objects, such as signs, or other vehicles, etc. that may be used in coordination with image processing.

Based on the image processing, the computing device operating vehicle 414 may determine the respective state of the traffic signal 416 and operate according to a control strategy that is in response to the state of the traffic signal 416. The computing device may select different control strategies based on different scenarios.

In further examples, upon determining a state of the traffic signal 416, the vehicle 414 may be configured to determine actions of nearby vehicles. For example, if the traffic signal 416 turns from green to yellow, the vehicle 414 may be configured to search within captured images for indications of nearby vehicles braking, for example. Thus, by using additional information from other sources, e.g., from a sensor determining a state of the traffic signal 416, the vehicle 414 may focus on areas within images in which brake lights of vehicles may be present (e.g., such as a certain distance above ground level).

In some examples, a computing device controlling a vehicle may process some images without additional help from other sources and may set a priority for processing some images with certain objects applying information received from the additional sources. A computing device may develop more than one particular control strategy or choose one or more previously used control strategies in response to processing images through the assistance of additional information from sources, such as RADAR, LIDAR, maps, GPS, and other sensors.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A system comprising:

a vehicle having a camera subsystem and a sensor subsystem; and a computing device coupled to the vehicle, wherein the computing device is configured to:

receive, from the camera subsystem and the sensor subsystem, image data and sensor data representing an environment of the vehicle;

determine, based on the image data, a first representation of the environment that conveys respective positions for a plurality of objects located in the environment relative to the vehicle;

determine, based on the sensor data, a second representation of the environment that conveys respective positions for the plurality of objects located in the environment relative to the vehicle, wherein the second representation of the environment is determined independently from the first representation of the environment;

monitor, based on the second representation of the environment, for occluded objects detected by the sensor subsystem and that are at least partially not visible in the image data from the camera subsystem; and generate one or more commands to control movement of the vehicle based on the first representation of the environment and the monitoring for occluded objects.

2. The system of claim 1, wherein the second representation of the environment further conveys approximate height, width, and length for the plurality of objects.

3. The system of claim 1, wherein the sensor subsystem comprises one or more lidar units.

4. The system of claim 3, wherein the sensor subsystem further comprises one or more radars.

5. The system of claim 1, wherein the camera subsystem comprises at least two cameras.

6. The system of claim 1, wherein the computing device is further configured to:

monitor for occluded objects that are at least partially occluded in the first representation of the environment by performing a transform to correlate a portion of the second representation of the environment to a portion of the first representation of the environment.

7. The system of claim 6, wherein the transform involves using a rotation or translation to map the portion of the second representation of the environment to the portion of the first representation of the environment.

8. The system of claim 7, wherein the portion of the second representation of the environment includes one or more objects that are not visible in the portion of the first representation of the environment.

9. The system of claim 1, wherein the computing device is configured to:

detect one or more occluded objects that are represented in the second representation of the environment, wherein the one or more occluded objects are at least partially not visible in the first representation of the environment; and adjust a control strategy for the vehicle based on detecting the one or more occluded objects.

10. A method comprising:

receiving, at a computing device and from a camera subsystem and a sensor subsystem of a vehicle, image data and sensor data representing an environment of the vehicle;

determining, based on the image data, a first representation of the environment that conveys respective positions for a plurality of objects located in the environment relative to the vehicle;

determining, based on the sensor data, a second representation of the environment that conveys respective positions for the plurality of objects located in the environment relative to the vehicle, wherein the second representation of the environment is determined independently from the first representation of the environment;

monitoring, based on the second representation of the environment, for occluded objects detected by the sensor subsystem and that are at least partially not visible in the image data from the camera subsystem; and generating one or more commands to control movement of the vehicle based on the first representation of the environment and the monitoring for occluded objects.

11. The method of claim 10, wherein the sensor subsystem comprises one or more lidar units.

12. The method of claim 11, wherein the sensor subsystem further comprises one or more radars.

13. The method of claim 10, wherein the camera subsystem comprises at least two cameras.

14. The method of claim 10, wherein monitoring for occluded objects comprises:

performing a transform to correlate a portion of the second representation of the environment to a portion of the first representation of the environment, wherein the transform involves using a rotation or translation to map the portion of the second representation of the environment to the portion of the first representation of the environment.

15. The method of claim 14, wherein the portion of the second representation of the environment includes one or more objects that are not visible in the portion of the first representation of the environment.

16. The method of claim 10, further comprising:

detecting one or more occluded objects that are represented in the second representation of the environment, wherein the one or more occluded objects are at least partially not visible in the first representation of the environment; and adjusting a control strategy for the vehicle based on detecting the one or more occluded objects.

17. The method of claim 10, wherein the monitoring for occluded objects comprises using distance information from the sensor subsystem to determine that a first object is closer to the vehicle than a second object and that the second object is at least partially occluded by the first object in the image data.

18. A non-transitory computer readable medium having stored thereon executable instructions that, upon execution by a computing system, cause the computing device to perform functions comprising:

receiving, from a camera subsystem and a sensor subsystem of a vehicle, image data and sensor data representing an environment of the vehicle;

determining, based on the image data, a first representation of the environment that conveys respective positions for a plurality of objects located in the environment relative to the vehicle;

determining, based on the sensor data, a second representation of the environment that conveys respective positions for the plurality of objects located in the environment relative to the vehicle, wherein the second representation of the environment is determined independently from the first representation of the environment;

monitoring, based on the second representation of the environment, for occluded objects detected by the sensor subsystem and that are at least partially not visible in the image data from the camera subsystem; and generating one or more commands to control movement of the vehicle based on the first representation of the environment and the monitoring for occluded objects.

19. The non-transitory computer readable medium of claim 18, wherein receiving sensor data representing the environment of the vehicle comprises:

receiving first sensor data from a lidar and second sensor data from a radar; and wherein determining the second representation of the environment comprises:

performing sensor fusion to determine the second representation of the environment based on the first sensor data and the second sensor data.

20. The non-transitory computer readable medium of claim 18, wherein determining the second representation of the environment comprises:

determining the second representation of the environment further based on a map.

* * * * *